Patented Oct. 3, 1933

1,928,739

UNITED STATES PATENT OFFICE 1,928,739

RESIN AND VARNISH

Norman Strafford, Crumpsall, Manchester, England, assignor to Imperial Chemical Industries Ltd., a corporation of Great Britain No Drawing. Application February 11, 1931, Serial No. 515,141, and in Great Britain February 15, 1930

8 Claims. (Cl. 134—26)

My invention relates to improvements in varnishes and the like, and in particular to compositions suitable for use as electrically resistant coatings.

It is well known that resinous phenol-formaldehyde condensation products are sparingly soluble in hydrocarbon solvents and that the films or coatings obtained from them are after heat treatment either brittle or insufficiently flexible. Many attempts have been made to overcome these defects by incorporating oils or other substances with the phenol-formaldehyde condensation products but the results have not been satisfactory. Lacquers have been made containing fatty oils and phenol-formaldehyde condensation products but they tend to yield films which because of the incompatibility of the condensation product and the fatty oil, are opalescent and therefore valueless.

Now the object of the present invention is to produce a homogeneous composition possessing thermo-hardening properties and containing both fatty oil and phenol-formaldehyde condensation product, and to this end I bring about the initial condensation between the phenol and the formaldehyde in presence of the chosen fatty oil and under chosen physical conditions.

Condensations of phenols with formaldehyde are usually carried out in presence of inorganic catalysts, which may be of an alkaline or acid nature. I find, when attempts are made to effect the condensation of phenol-formaldehyde and fatty oil in presence of such catalysts, that the oil does not enter into combination, or enters only to a limited extent, so that the product after dehydration in vacuo is a heterogeneous mixture. When, however, the interaction is carried out in similar conditions without a catalyst, combination is extremely slow, and the product is of no technical value.

My invention is based on the discovery that the condensation of phenol, formaldehyde, and chosen fatty oils takes place readily in the absence of any catalyst when the interaction is caused to take place at a high temperature in a hermetically sealed vessel. I heat the mixture at, for example, 120 degrees centigrade or higher temperature in an autoclave or digester and so obtain a thick coarsely dispersed emulsion of resinous condensation product and water. I dehydrate this mixture for example, in vacuo at a temperature rising to 100 degrees centigrade, and so obtain a thick viscous liquid or semi solid mass which is a homogeneous commingling or combination of phenol-formaldehyde resin and the fatty oil. I may, in order that the product should have an appropriate consistency, subject it to a further heat treatment at atmospheric pressure and at 100 degrees centigrade or higher temperature. I may then dissolve it in a suitable solvent, e. g., benzol or solvent naphtha, in order to produce a varnish.

I do not limit myself to the temperature mentioned above for bringing about the condensation. I have found that the invention is equally well applied when the combination of our chosen fatty oils, phenol and formaldehyde is carried out at 140 degrees centigrade, or at 150 degrees centigrade, and that the time required for the desired interaction to take place is dependent on the temperature, so that, for example, about one to one-and-a-half hours suffices at 140 degrees centigrade, whereas three hours or more may be needed at 120 degrees centigrade. The temperature should not rise above the point at which decomposition of the particular reaction mixture will take place.

When I speak of "phenol" I wish it to be understood that I am using the term as the name of a genus, and not of a single compound. The term "chosen fatty oils" as used in this specification comprises tung oil (raw or bodied) and castor oil.

I further find that my invention is applicable also to the incorporation of a mixture of the chosen fatty oil and a natural resin such as colophony with a phenol-formaldehyde condensation product.

My invention is illustrated, but not limited by the following examples, in which the parts are by weight.

Example 1

One hundred parts of commercial cresol (containing about 50% of meta-cresol), 75 parts of tung oil, and 100 parts of formaldehyde (40%), are heated in a sealed vessel provided with a stirrer at a temperature of 120° C. for 3–4 hours. The resulting thick mixture is dehydrated by heating in vacuo at a temperature rising to 100° C. until substantially no more volatile matter is evolved. The product is a homogeneous sticky viscous liquid or semi-solid at ordinary temperatures. It may be dissolved in an equal weight of solvent naphtha to produce a solution which is of particular value as an electrical insulating varnish.

Example 2

If in place of the raw tung oil in Example 1 I employ tung oil which has previously been "bodied" by heat treatment at 175° C.–180° C.

in an inert atmosphere for 2-5 hours, the resulting resin has more "body" and produces a more viscous solution for a given concentration. The hardened film, also, whilst extremely flexible and firmly adherent to metal, is tougher than that produced from the raw China-wood oil.

*Example 3*

One hundred parts of commercial cresol, 60 parts of castor oil and 100 parts of 40% formaldehyde are treated exactly as in Example 1. The resulting resin produces a varnish the hardened coat from which is somewhat softer and rather more flexible but less tough, than the corresponding coat from Example 1. The resistance to water is also not so good as in the tung oil products.

*Example 4*

One hundred parts of cresol, 37.5 parts of tung oil, 37.5 parts of castor oil, and 100 parts of 40% formaldehyde are heated as in Example 1.

The hardened coat from the resulting varnish is somewhat softer and more flexible, but less water-resistant than that of Example 1.

*Example 5*

One hundred parts of crystalline phenol, 50 parts of castor oil, and 110 parts of 40% formaldehyde are treated as before.

The resin has properties somewhat similar to that of Example 3.

*Example 6*

One hundred parts of commercial xylenol, 105 parts of 40% formaldehyde and 90 parts of tung oil are treated in a digester as in previous example.

The resin is very similar in properties to that described in Example 1.

The varnishes obtained by the process of my invention, yield coatings which, after stoving for several hours at 100 to 120 degrees centigrade, are characterized by outstanding flexibility, toughness, and resistance to moisture. They are particularly valuable in the electrical industry as insulating varnishes because of the high dielectric strength and low water-absorptive capacity of the hardened coatings. The properties of the coatings depend naturally upon the nature of the oil used and the proportions present. Tung oil, for example, when used either raw, or after "bodying" by means of a heat treatment, yields tough and highly water-resistant coatings, whereas these when castor oil is used although useful are less firm and tough.

As many apparently widely different embodiments of this invention may be made without departing from the spirit and scope thereof, it is to be understood that I do not limit myself to the specific embodiments thereof except as defined in the appended claims.

I claim:

1. A process of manufacturing oil modified resins of the phenol-formaldehyde type which comprises heating at elevated temperature and pressure a phenol, an aqueous solution of formaldehyde and a fatty oil selected from the class consisting of tung oil and castor oil.

2. A process of manufacturing oil modified resins of the phenol-formaldehyde type which comprises heating at elevated temperature and pressure a phenol, an aqueous solution of formaldehyde and a fatty oil selected from the class consisting of tung oil and castor oil, and dehydrating the product obtained.

3. A process of manufacturing oil modified resins of the phenol-formaldehyde type which comprises heating at elevated temperature and pressure a phenol, formaldehyde and a fatty oil selected from the class consisting of tung oil and castor oil, dehydrating the product obtained, and subjecting the dehydrated product to heat treatment at atmospheric pressure.

4. A process of manufacturing oil modified resins of the phenol-formaldehyde type which comprises heating in a closed vessel at a temperature not less than about 120° C. a phenol, formaldehyde and a fatty oil selected from the class consisting of tung oil and castor oil.

5. A process of manufacturing oil modified resins of the phenol-formaldehyde type which comprises heating in a closed vessel at a temperature not less than about 120° C. a phenol, formaldehyde, a natural resin, and a fatty oil selected from the class consisting of tung oil and castor oil.

6. A process of manufacturing oil modified resins of the phenol-formaldehyde type which comprises heating in a closed vessel at a temperature not less than about 120° C. a phenol, formaldehyde, colophony, and a fatty oil selected from the class consisting of tung oil and castor oil.

7. A process of manufacturing oil modified resins of the phenol-formaldehyde type which comprises heating in a closed vessel at a temperature not less than about 120° C. a phenol, formaldehyde and a fatty oil selected from the class consisting of tung oil and castor oil, and dehydrating the product in vacuo at a temperature not greater than 100° C.

8. A process of manufacturing oil modified resins of the phenol-formaldehyde type which comprises heating in a closed vessel at a temperature not less than about 120° C. a phenol, formaldehyde and a fatty oil selected from the class consisting of tung oil and castor oil, dehydrating the product in vacuo at a temperature not greater than 100° C., and heating the dehydrated product to a temperature not less than 100° C. at atmospheric pressure.

NORMAN STRAFFORD.